United States Patent [19]

Takagi et al.

[11] Patent Number: 4,996,177

[45] Date of Patent: Feb. 26, 1991

[54] SINTERED ALUMINA ARTICLE WITH HIGH FLEXURAL STRENGTH AND PROCESS FOR PRODUCING SAME

[75] Inventors: Shigehide Takagi, Narashino; Hideo Yano, Tokorozawa; Takashi Oku, Funabashi; Keijiro Shigeru, Funabashi; Yoshifumi Kuboto, Funabashi; Tsutomu Shishikura, Chiba, all of Japan

[73] Assignee: Sumitomo Cement Co., Ltd., Tokyo, Japan

[21] Appl. No.: 222,976

[22] Filed: Jul. 22, 1988

[30] Foreign Application Priority Data

Jul. 27, 1987 [JP] Japan .................................. 62-185539

[51] Int. Cl.$^5$ ............................................. C04B 35/10
[52] U.S. Cl. .................................... 501/153; 501/127; 428/114
[58] Field of Search .................. 501/153, 127; 428/114

[56] References Cited

U.S. PATENT DOCUMENTS 2,642,337  6/1953  Newsome ............................ 501/86
3,740,243  6/1971  Kappes et al. ...................... 501/153

FOREIGN PATENT DOCUMENTS 0398694  2/1970  U.S.S.R. ............................. 501/153

OTHER PUBLICATIONS

Yanaagide et al.; "A Discussion on the Phase Diagram of the System $Al_2O_3$-$H_2O$ Considering the Transformation Mechanism of the Polymorphs Appearing in It" J. Ceram. Assoc. Japan, vol. 14(3) pp. 36-41, 1966.
Journal of Physical Chemistry, vol. 67, pp. 835-839, 1963 "The Solubility of Corundum in Basic Hydrothermal Solvents".

Primary Examiner—William R. Dixon, Jr.
Assistant Examiner—C. Melissa Bonner
Attorney, Agent, or Firm—Armstrong, Nikaido, Marmelstein, Kubovcik & Murray

[57] ABSTRACT

A sintered alumina article having an excellent flexural strength comprises numerous sintered plate crystalline corundum particles each having cleavage surface planes and accumulated on and bonded to each other in a manner such that the cleavage surface planes of the accumulated plate crystalline particles are substantially in parallel to each other and can be produced by forming the plate crystalline corundum particles into a predetermined shape so that the plate crystalline particles are accumulated in the above-mentioned manner; and by sintering the resultant precursory article at 1500° C. or more under the ambient atmospheric pressure.

5 Claims, 1 Drawing Sheet

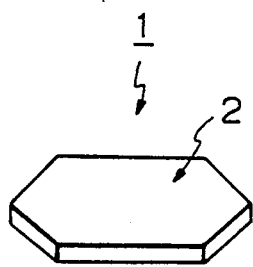
Fig. 1
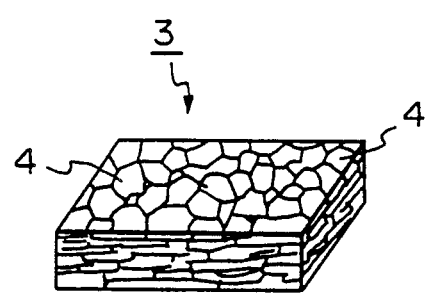
Fig. 2
Fig. 3
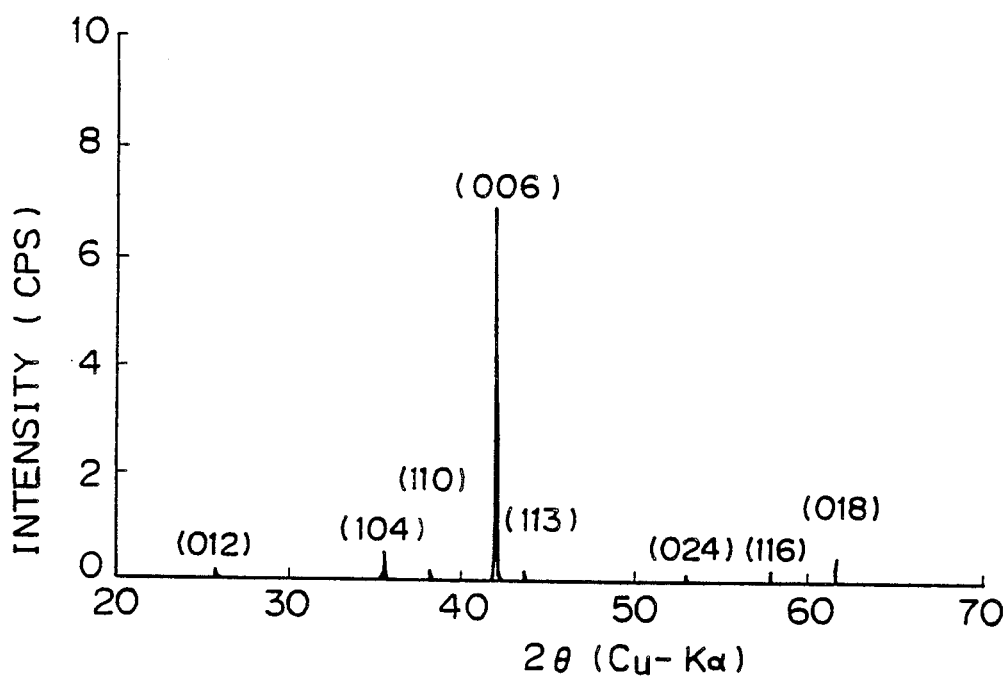

SINTERED ALUMINA ARTICLE WITH HIGH FLEXURAL STRENGTH AND PROCESS FOR PRODUCING SAME

BACKGROUND OF THE INVENTION (1) Field of the Invention

The present invention relates to a sintered alumina article with a high flexural strength and a process for producing same. More particularly, the present invention relates to a sintered alumina article which has an excellent flexural strength and is useful as a highly reliable electronic construction material and medical material, and a process for producing the same under an ambient atmospheric sintering pressure.

(2) Description of the Related Art

Conventional sintered alumina articles which have been prepared by forming corundum ($Al_2O_3$) particles into a predetermined shape and then sintering the shaped precursory article under ambient atmospheric pressure exhibits a poor flexural strength of 2000 to 4000 $kg/cm^2$.

Another conventional sintered alumina article is produced by sintering the shaped precursory article under a high pressure and exhibits an enhanced flexural strength of 6000 to 8000 $kg/cm^2$, but this high pressure sintering procedure is costly, and thus makes the resultant sintered article expensive. Also, the high pressure sintering procedure restricts the shaping of the sintered article.

A sintered ferrite article, in which sintered ferrite particles are oriented, is now in practical use. The orientation of the ferrite particles provides an anisotropic magnet but not a high strength article. This type of sintered ferrite article is produced by shaping ferrite plate crystalline particles into tapes by a doctor blade method or a calender method, superimposing the tapes on each other, and sintering the superimposed tapes. The plate crystalline ferrite particles can be easily produced by grinding ferrite lumps, and thus the oriented, sintered ferrite article can be easily produced.

Nevertheless, it is very difficult to produce corundum plate crystalline particles by grinding, and thus an oriented, sintered corundum article cannot be easily obtained.

The plate crystalline corundum particles can be produced in accordance with the method disclosed in Japanese Examined Patent Publication No. 37-7750 by a hydrothermal treatment of aluminum oxide particles or aluminum hydroxide particles at a temperature of 100° C. to 300° C. under a pressure of 20 to 100 atmospheres to produce boehmite (AlOOH) particles, and by a further hydrothermal treatment of the boehmite particles with water or an aqueous alkali solution at a temperature of 350° C. or more under a pressure of 200 atmospheres or more. In the above-mentioned method, the corundum particles can be produced by a treatment under a very high pressure of 200 atmospheres or more, and this high pressure causes the resultant corundum plate crystalline particles to have a large thickness of 1 $\mu m$ or more, and it is difficult to orient these very thick particles in the intended article.

In another method, the plate crystalline corundum particles can be produced by dry heat-treating aluminum oxide particles or aluminum hydroxide particles, but the particles obtained by the above-mentioned method have a large particle size of 10 $\mu m$ or more, and thus it is difficult to firmly bond them together.

SUMMARY OF THE INVENTION

An object of the present invention is to provide a sintered alumina article with a high flexural strength comparable to that of a conventional sintered alumina article produced by a high pressure sintering method, and a process for producing the same under an ambient atmospheric pressure at a low cost.

Another object of the present invention is to provide a sintered alumina article with a high flexural strength and in a non-restricted shape and a process for producing the same, which can be easily carried out without restricting of the shape of the article.

The above-mentioned objects can be attained by the sintered alumina article and the process of the present invention.

The sintered alumina article of the present invention comprises sintered plate crystalline corundum particles having two parallel cleavage surface planes which are accumulated on and bonded to each other in such a manner that the cleavage surface planes of the accumulated plate crystalline corundum particles are substantially in parallel to each other.

The process of the present invention comprises the steps of:

shaping plate crystalline corundum particles having two parallel cleavage surface planes into a predetermined shape to provide a precursory article in which the plate crystalline particles are accumulated on each other in such a manner that the cleavage surface planes of the accumulated plate crystalline particles are substantially in parallel to each other; and sintering the resultant precursory article at a temperature of 1500° C. or more under ambient atmospheric pressure.

BRIEF DESCRIPTION OF THE DRAWINGS

FIG. 1 shows a plate crystalline corundum particles usable for the present invention;

FIG. 2 shows an embodiment of the sintered alumina article of the present invention in which numerous plate crystalline corundum particles are accumulated on and bonded to each other; and, FIG. 3 shows an X-ray diffraction pattern of an embodiment of the sintered alumina article of the present invention.

DESCRIPTION OF THE PREFERRED EMBODIMENTS

The sintered alumina article of the present invention comprises numerous sintered plate crystalline corundum ($Al_2O_3$) particles each having two cleavage surface planes thereof which are parallel to a pinacoid of the crystal. The plate crystalline corundum particles in the article are accumulated on and bonded to each other so that the cleavage surface planes of the accumulated plate crystalline particles are substantially in parallel to each other. That is, the plate crystalline particles in the sintered article are in an oriented state.

The degree of orientation of the corundum plate crystalline particles in the sintered alumina article can be determined from an X-ray diffraction pattern thereof, and is preferably 30% or more, more preferably 40% or more.

The sintered alumina article of the present invention is produced by accumulating plate crystalline corundum particles each having two parallel cleavage surface planes, into a predetermined shape to provide a precursory article in which the plate crystalline particles are on each other in such a manner that the cleavage surface planes of the accumulated plate crystalline particles are substantially in parallel to each other. Then, the precursory article is sintered at a temperature of 1500° C. or more, preferably, 1500° C. to 1900° C., under ambient atmospheric pressure to allow the accumulated plate crystalline particles to firmly bonded to each other.

The plate crystalline corundum particles preferably have a major axis of the pinacoids thereof of from 0.5 to 10 $\mu$m and a thickness of 0.01 to 1 $\mu$m.

When the major axis of the pinacoids of the plate crystalline corundum particles is less than 0.05 $\mu$m, the resultant sintered article sometimes exhibits an unsatisfactory castability, and when the major axis is more than 10 $\mu$m, the resultant sintered article sometimes exhibits unsatisfactory sintering.

Also, when the thickness of the plate crystalline particles is less than 0.01 $\mu$m, the resultant sintered article sometimes exhibits unsatisfactory castability, and when the thickness is more than 1 $\mu$m, the resultant sintered article sometimes exhibits unsatisfactory orientation.

The corundum plate crystalline particles usable for the present invention can be produced by a hydrothermal treatment of gibbsite (Al(OH)$_3$) particles having a major axis of 10 $\mu$m or less, preferably, 0.01 $\mu$m to 10 $\mu$m, at a temperature of 350° C. or more, preferably 350° C. to 800° C. under a pressure of 100 atmospheres or less, preferably 5 to 100 atmospheres.

In the hydrothermal treatment for the gibbsite particles, if the gibbsite particles have a major axis of more than 10 $\mu$m, only a very high pressure of 200 atmospheres or more, allows the gibbsite particles to be converted to corundum particles, but this conversion cannot occur under a pressure of 100 atmospheres or less.

Also, when the gibbsite particles have a major axis of 10 $\mu$m or less, they can be directly converted to plate crystalline corundum particles, having two parallel cleavage surface planes and an appropriate size and thickness, by hydrothermal treatment at a temperature of 350° C. or more under a relatively low pressure of 100 atmospheres or less, without passing through the state of boehmite (AlOOH).

In the conversion of the gibbsite particles to the plate crystalline corundum particles, if the hydrothermal treatment temperature is less than 350° C., corundum particles cannot be produced In the range of hydrothermal treatment temperature of 350° C. or more, preferably from 350° C. to 800° for the gibbsite particles, the higher the temperature, the smaller the thickness of the resultant plate corundum crystalline particles. Also, if the hydrothermal treatment pressure is more than 100 atmospheres, the resultant corundum particles are excessively thick. The resultant large thickness of the plate crystalline corundum particles is not suitable for producing the sintered alumina article of the present invention.

In the range of hydrothermal treatment pressures of from 5 to 100 atmospheres for the gibbsite particles, the lower the pressure, the smaller the thickness of the resultant plate crystalline corundum particles.

In the conversion of the gibbsite article, an addition of 0.01 to 5% by weight of sodium carbonate or sodium hydroxide to the hydrothermal treatment system effectively accelerates the production of the corundum plate crystalline particles.

Also, an addition of corundum particles, having a smaller size than that of the desired corundum particles, to the hydrothermal treatment system effectively promotes the growth of the corundum plate crystals, because the small corundum particles serve as nuclei for the growth of corundum plate crystals.

Referring to FIG. 1, a corundum plate crystalline particle 1 has two cleavage planes 2 in parallel to each other and can be cleaved in parallel to a pinacoid of the crystal, and thus to the surface planes 2.

Referring to FIG. 2, a sintered alumina article 3 is composed of numerous corundum plate crystalline particles 4 which are accumulated on and bonded to each other in such a manner that the cleavage surface planes of the accumulated plate crystalline corundum particles 4 are substantially in parallel to each other. That is, the accumulated plate crystalline corundum particles can be firmly bonded to each other at the cleavage surface planes thereof having large areas.

The sintered alumina article of the present invention may be in the form of a stratum. Also, the stratum may be in the form of a tape.

In the preparation of a precursory article, the plate crystalline corundum particles are mixed with a combustible bonding material, for example, an organic polymeric material consisting of, for example, at least one member selected from polyvinyl alcohol, polyvinylbutylal and polyethyleneglycols, and the mixture is coated in the form of a stratum, for example, a tape, on a smooth surface of a substrate by a doctor blade method or a calender method. When the mixture is coated on the smooth surface of the substrate by the above-mentioned method, a shearing force and a pressing force are applied to the plate crystalline particles so that the cleavage surface planes of the plate crystalline particles become parallel to the surface of the tape, and thus become parallel to each other. The ease of the arrangement of the plate crystalline particles so that the pinacoids thereof become parallel to each other increases with an increase in a ratio of the major axis of the pinacoids to the thickness of the plate crystalline particle and with a decrease in the thickness of the tape-shaped article.

The combustible bonding material is preferably used in an amount of from 1% to 20%, more preferably from 5% to 10% based on the particles to be bonded.

The precursory article may be formed by superimposing a plurality of the precursory stratum (tape)-shaped articles on each other and by heat pressing the superimposed articles at a temperature of from 50° C. to 200° C., preferably about 100° C., to adhere them to each other to form one body.

Another precursory article may be formed by alternately superimposing one or more precursory stratum (tape)-shaped articles on one or more additional precursory tape- or stratum shaped articles consisting essentially of nonplate-like alumina particles, for example, nonplate-like corundum crystalline particles, amorphous alumina particles or a mixtures at least two of the above-mentioned types of particles, by heat-pressing the superimposed precursory articles at a temperature of from 50° C. to 200° C. to adhere them together to form one body.

The nonplate-like alumina particles preferably have a smaller size than that of the plate crystalline corundum particles, and thus are easily sintered. The amorphous alumina particles preferably have a size of 1 μm or less.

The precursory article is sintered at a temperature of 1500° C. or more, preferably from 1500° C. to 1900° C., for a period of from 1 to 24 hours, preferably from 3 to 10 hours, under ambient atmospheric pressure.

If the sintering temperature is less than 1500° C., the alumina article cannot be sufficiently sintered, and thus the resultant article exhibits an unsatisfactory flexural strength. The degree of orientation of the plate crystalline corundum particles in the sintered alumina article increases with an increase in the sintering temperature and in the sintering time.

When the precursory article, composed of one or more plate crystalline corundum particle stratums or tapes and one or more additional nonplate-like alumina particle stratums or tapes, is sintered, there is a slight difference in thermal shrinkage between the plate crystalline particle stratum and the nonplate-like particle stratum.

Usually, the shrinkage of the sintered additional nonplate-like particle stratums is slightly larger than that of the sintered plate crystalline particle stratums in the sintering step.

This larger shrinkage of the sintered additional nonplate-like particle strata causes a compressive force to be applied to the sintered plate crystalline particle stratum, and this application of a compressive force causes a prestress corresponding to the compressive force to be generated on the sintered plate crystalline particle stratums. The prestress generated on the sintered plate crystalline particle stratum effectively absorbs at least a portion of an external force applied to the sintered alumina article and increases the flexural strength of the sintered alumina article.

In the process of the present invention, the sintering procedure is carried out under ambient atmospheric pressure and, thus, at a low cost.

As described above, the sintered alumina article of the present invention has an excellent flexural strength and can be easily produced at a low cost. Therefore, the sintered alumina article of the present invention is useful not only for electronic materials, and medical materials but also for construction materials, and thus can be utilized in various industries.

The sintered alumina article of the present invention is advantageous in the following items.

1. Although the sintering operation is carried out under ambient atmospheric pressure, the resultant sintered alumina article of the present invention exhibits a high level of flexural strength comparable to that produced by the conventional sintering operation under a high pressure.

2. The sintering method under ambient atmospheric pressure, in accordance with the present invention, enables the sintered alumina article to be formed into any type of shape; whereas, in the conventional high pressure sintering method, the shapes of the possible resultant sintered alumina articles are restricted to specific types.

3. The sintered alumina articles of the present invention have a high filling density, and thus are useful in various fields, for example, as electronic materials, construction materials, and medical materials, with a high reliability.

The present invention will be further explained by way of specific examples which, however, are representative and do not restrict the scope of the present invention in any way.

EXAMPLE 1

(A) Preparation of plate crystalline corundum ($Al_2O_3$) particles

A mixture of 89.74 parts of weight of gibbsite (Al(OH)$_3$) particles having an average size of 1.0 μm, 0.26 parts by weight of sodium carbonate particles, and 10 parts by weight of nonplate-like corundum particles having an average size of 0.5 μm was hydrothermally treated at a temperature of 600° C. and under a pressure of 20 atmospheres for 15 hours. The resultant plate crystalline corundum particles had an average major axis of the cleavage surface planes of 1.0μm and an average thickness of 0.2 μm.

(B) Production of sintered alumina article

The plate-crystalline corundum particles in an amount of 100 parts of weight were mixed with 28 parts by weight of an aqueous solution of 33% by weight of polyvinyl alcohol. The mixture was shaped into a tape having a thickness of 0.2 mm, by a roll shaping machine, and the tape was then cut into ten pieces.

The ten pieces of tapes were then superimposed one on the other, and heat pressed at a temperature of 100° C. The resultant precursory article was sintered at a temperature of 1800° C. for about 5 hours.

The resultant sintered alumina article (tape) exhibited a flexural strength of 5800 kg/cm$^2$ and a degree of orientation of 40%, determined from an X-ray diffraction diagram thereof.

EXAMPLE 2

(A) Preparation of plate crystalline corundum particles

The same procedures as those described in Example 1 were carried out except that the gibbsite particles had an average size of 3.0 μm and the resultant plate crystalline corundum particles had an average major axis of the cleavage surface planes of 3.0 μm and a thickness of 0.2 μm.

(B) Production of a sintered alumina article

The same procedures as those described in Example 1 were carried out except that the plate crystalline corundum particles of (A) above were used.

The resultant sintered alumina article exhibited a flexural strength of 6200 kg/cm$^2$ and a degree of orientation of 90%, which was determined from an X-ray diffraction diagram (Cu-Kα, 40 kV, 100 mA, graphite monochromometer, DS 1°, SS 0.15) shown in FIG. 3.

COMPARATIVE EXAMPLE 1

(A) Preparation of comparative corundum particles

The same procedures as those described in Example 1 were carried out except that the hydrothermal treatment pressure was 200 atmospheres.

The resultant product was composed of nonplate crystalline corundum particles having an average major axis of 1 μm and an average thickness of 1 μm.

(B) Production of a comparative sintered alumina article

The same procedures as those described in Example 1 were carried out except that the comparative nonplate crystalline corundum particles of (A) above were used.

The resultant comparative sintered alumina article had an unsatisfactory flexural strength of 3200 kg/cm$^2$ and a low degree of orientation of 15%, as determined from an X-ray diffraction diagram thereof.

EXAMPLE 3

Five pieces of the same precursory tape comprising the plate corundum crystalline particles and having a thickness of 0.2 mm, as described in Example 2, were alternately superimposed on five pieces of additional precursory tape which had a thickness of 0.05 mm prepared in the same manner as described in Example 2, except that amorphous alumina particles having an average size of 0.1 μm were used instead of the plate crystalline corundum particles.

The superimposed tapes were heat-pressed at a temperature of 100° C., and the resultant precursory article was sintered at a temperature of 1800° C. for about 5 hours.

The resultant sintered alumina article had a flexural strength of 8500 kg/cm$^2$ and the plate crystalline corundum particle stratums had a degree of orientation of 60%.

EXAMPLE 4

The same procedures as those described in Example 3 were carried out except that the additional precursory tapes were prepared from nonplate-crystalline corundum particles each having an average size of 0.5 μm, a thickness of 0.2 mm.

The resultant sintered alumina article had a flexural strength of 7700 kg/cm$^2$ and the plate crystalline corundum particle stratums had a degree of orientation of 90%.

COMPARATIVE EXAMPLE 2

The same procedures as those described in Example 4 were carried out except that the precursory article was prepared from ten pieces of the same additional precursory tape as described in Example 4.

The resultant comparative sintered alumina article had a flexural strength of 2500 kg/cm$^2$ and a degree of orientation of 2%.

We claim:

1. A sintered alumina article consisting essentially of sintered plate crystalline corundum particles which are a product of hydrothermal treatment of gibbsite (Al(OH)$_3$) particles having a size of 10 μm or less, at a temperature of 350° C. to 800° C. under a pressure of 100 atmospheres or less, wherein said plate crystalline particles have two parallel cleavage surface planes, and wherein said plate crystalline particles have been accumulated on and bonded to each other such that the cleavage surface planes of the accumulated plate crystalline particles are substantially parallel to each other and wherein said crystalline particles have a major dimension of the cleavage surface planes thereof of from 0.05 to 10 μm and a thickness thereof of 0.01 to 1 μm; said sintered alumina article having a flexural strength of at least 5800 kg/cm$^2$.

2. The sintered alumina article as claimed in claim 1, which is in the form of a stratum.

3. The sintered alumina article as claimed in claim 2, wherein the stratum is in the form of a tape.

4. The sintered alumina article as claimed in claim 1, wherein the sintered plate crystalline corundum particles are in the form of one or more stratums which are alternately superimposed on and bonded to one or more additional stratums consisting essentially of sintered non-plate like alumina particles.

5. The sintered alumina article as claimed in claim 4, wherein the stratum and the additional stratum are in the form of a tape.

* * * * *

UNITED STATES PATENT AND TRADEMARK OFFICE
CERTIFICATE OF CORRECTION

PATENT NO. : 4,996,177
DATED : February 26, 1991
INVENTOR(S) : TAKAGI et al

It is certified that error appears in the above-identified patent and that said Letters Patent is hereby corrected as shown below:

On the title page, item [75], "Kuboto" should read --Kubota--.

Signed and Sealed this

Second Day of February, 1993

Attest:

STEPHEN G. KUNIN

*Attesting Officer*  *Acting Commissioner of Patents and Trademarks*